US008947220B2

(12) United States Patent
Martin et al.

(10) Patent No.: US 8,947,220 B2
(45) Date of Patent: Feb. 3, 2015

(54) SPEECH RECOGNITION FUNCTIONALITY IN A VEHICLE THROUGH AN EXTRINSIC DEVICE

(71) Applicant: GM Global Technology Operations LLC, Detroit, MI (US)

(72) Inventors: Douglas C. Martin, Oxford, MI (US); Nathan D. Ampunan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 13/665,127

(22) Filed: Oct. 31, 2012

(65) Prior Publication Data

US 2014/0120892 A1     May 1, 2014

(51) Int. Cl.
*B60Q 1/00*     (2006.01)

(52) U.S. Cl.
USPC ....... 340/438; 340/459; 340/4.14; 455/426.1; 455/414.1; 455/41.2; 704/275; 704/243

(58) Field of Classification Search
USPC ............ 340/4.14, 438, 459, 426.2, 521, 439; 704/275, 243, E15.007, E11.001, 257, 704/255, 249, 231, 235, 254, 251; 455/569.2, 418, 402.2, 404.1, 426.1, 455/414.1, 41.2
See application file for complete search history.

(56) References Cited

U.S. PATENT DOCUMENTS

| | | | |
|---|---|---|---|
| 7,451,085 B2 * | 11/2008 | Rose et al. | 704/244 |
| 7,774,202 B2 * | 8/2010 | Spengler et al. | 704/236 |
| 8,600,762 B2 * | 12/2013 | Shin | 704/275 |
| 8,612,221 B2 * | 12/2013 | Yoshizawa et al. | 704/231 |
| 8,666,750 B2 * | 3/2014 | Buck et al. | 704/275 |
| 2002/0178003 A1 * | 11/2002 | Gehrke et al. | 704/246 |
| 2004/0101198 A1 * | 5/2004 | Barbara | 382/181 |
| 2004/0267528 A9 * | 12/2004 | Roth et al. | 704/251 |
| 2006/0100871 A1 * | 5/2006 | Choi et al. | 704/254 |
| 2007/0112571 A1 * | 5/2007 | Thirugnana | 704/270 |
| 2008/0120110 A1 * | 5/2008 | McDonald et al. | 704/257 |
| 2008/0262849 A1 * | 10/2008 | Buck et al. | 704/275 |
| 2010/0198598 A1 * | 8/2010 | Herbig et al. | 704/240 |
| 2011/0143750 A1 * | 6/2011 | Farrell et al. | 455/426.1 |
| 2012/0183221 A1 * | 7/2012 | Alasry et al. | 382/181 |
| 2012/0313768 A1 * | 12/2012 | Campbell et al. | 340/438 |
| 2013/0018864 A1 * | 1/2013 | Regan et al. | 707/706 |
| 2013/0176377 A1 * | 7/2013 | Ho | 348/14.02 |
| 2013/0253926 A1 * | 9/2013 | Takahashi | 704/235 |
| 2013/0289994 A1 * | 10/2013 | Newman et al. | 704/254 |
| 2013/0332164 A1 * | 12/2013 | Nalk | 704/243 |

(Continued)

*Primary Examiner* — Hoi Lau
(74) *Attorney, Agent, or Firm* — Cantor Colburn LLP

(57) ABSTRACT

Speech recognition in a vehicle through an extrinsic device includes detecting, via the vehicle, a presence of a mobile communications device that is configured with a speech recognition component. A vehicle processor encodes data lists stored in the vehicle and transmits the data lists and a vehicle identifier to the mobile communications device. In response to receiving a request to initiate a voice recognition session, the vehicle transmits the request and the vehicle identifier to the mobile communications device that causes activation of the speech recognition component. The mobile communications device retrieves the data lists via the identifier. In response to a voice command received by the speech recognition component, the speech recognition component interprets the voice command, determines an action by evaluating the voice command in view of the data lists, and transmits an instruction to the vehicle processor directing the vehicle to implement the action.

20 Claims, 2 Drawing Sheets

(56) References Cited

U.S. PATENT DOCUMENTS

| | | | |
|---|---|---|---|
| 2014/0025377 A1* | 1/2014 | Koch et al. | 704/249 |
| 2014/0025380 A1* | 1/2014 | Koch et al. | 704/257 |
| 2014/0066053 A1* | 3/2014 | Burke et al. | 455/426.1 |
| 2014/0066132 A1* | 3/2014 | Burke et al. | 455/569.2 |
| 2014/0067403 A1* | 3/2014 | Burke et al. | 704/275 |
| 2014/0120892 A1* | 5/2014 | Martin et al. | 455/418 |

* cited by examiner

SPEECH RECOGNITION FUNCTIONALITY IN A VEHICLE THROUGH AN EXTRINSIC DEVICE

FIELD OF THE INVENTION

The subject invention relates to vehicle communications and, more particularly, to implementing speech recognition functionality in a vehicle through an extrinsic device.

BACKGROUND

Speech recognition functionality is a significant cost driver of infotainment systems, which keeps this feature out of base vehicles. However, most operators of vehicles travel with mobile communications devices that employ speech recognition capability.

Accordingly, it is desirable to provide a way to leverage the speech recognition capabilities of a mobile communications device in a vehicle to provide this function to occupants of the vehicle.

BRIEF SUMMARY

In one exemplary embodiment of the invention, a system is provided. The system includes a computer processor embedded in a vehicle and logic executable by the computer processor. The logic is configured to implement a method. The method includes detecting a presence of a mobile communications device in the vehicle via a communication component of the vehicle. The mobile communications device is configured with a speech recognition component. The method also includes encoding data lists of content stored in a memory device of the vehicle and transmitting the data lists of content and a unique identifier of the vehicle over a data connection to the mobile communications device. The data lists of content are linked to the unique identifier. In response to receiving a request to initiate a voice recognition session via an input component of the vehicle, the method includes transmitting the request and the unique identifier over the data connection to the speech recognition component of the mobile communications device, activating the speech recognition component responsive to the request, and retrieving the data lists of content from the mobile communications device via the unique identifier. In response to a user voice command received by the speech recognition component, the speech recognition component interprets the user voice command, determines an action by evaluating the user voice command in view of the data lists of content, and transmits an instruction to the computer processor, the instruction directing the vehicle to implement the action.

In another exemplary embodiment of the invention, a method is provided. The method includes detecting, via a communication component of a vehicle, a presence of a mobile communications device in the vehicle. The mobile communications device is configured with a speech recognition component. The method also includes encoding, via a computer processor embedded in the vehicle, data lists of content stored in a memory device of the vehicle and transmitting the data lists of content and a unique identifier of the vehicle over a data connection to the mobile communications device. The data lists of content are linked to the unique identifier. In response to receiving a request to initiate a voice recognition session via an input component of the vehicle, the method includes transmitting the request and the unique identifier over the data connection to the speech recognition component of the mobile communications device, activating the speech recognition component responsive to the request, and retrieving via a computer processor of the mobile communications device the data lists of content from the mobile communications device via the unique identifier. In response to a user voice command received by the speech recognition component, the speech recognition component interprets the user voice command, determines an action by evaluating the user voice command in view of the data lists of content, and transmits an instruction to the computer processor, the instruction directing the vehicle to implement the action.

In a further exemplary embodiment of the invention, a computer program product is provided. The computer program product includes a computer-readable storage medium having instructions embodied thereon, which when executed by a computer, causes the computer to implement a method. The method includes detecting, via a communication component of a vehicle, a presence of a mobile communications device in the vehicle via a communication component of the vehicle. The mobile communications device is configured with a speech recognition component. The method also includes encoding data lists of content stored in a memory device of the vehicle and transmitting the data lists of content and a unique identifier of the vehicle over a data connection to the mobile communications device. The data lists of content are linked to the unique identifier. In response to receiving a request to initiate a voice recognition session via an input component of the vehicle, the method includes transmitting the request and the unique identifier over the data connection to the speech recognition component of the mobile communications device, activating the speech recognition component responsive to the request, and retrieving the data lists of content from the mobile communications device via the unique identifier. In response to a user voice command received by the speech recognition component, the speech recognition component interprets the user voice command, determines an action by evaluating the user voice command in view of the data lists of content, and transmits an instruction to the computer processor, the instruction directing the vehicle to implement the action.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, vehicle-initiated speech recognition functions through an extrinsic device are provided. The exemplary vehicle-initiated speech recognition functions (also referred to herein as "speech recognition functions" and "voice recognition functions") leverage the functionality of mobile communications devices for use in a vehicle to provide speech recognition capabilities operable for implementing various vehicle functions. In an exemplary embodiment, a mobile communications device embedded with speech recognition components is provided with an application configured to receive metadata associated with the vehicle, activate its speech recognition components, and interpret voice commands from occupants of the vehicle. Once interpreted by the mobile communications device, the application transmits instructions to the vehicle directing corresponding vehicle components to implement an action associated with the voice commands. Likewise, the vehicle includes logic that is configured to communicate the metadata and speech recognition component activation requests. These and other features will be described herein.

Figure 1:
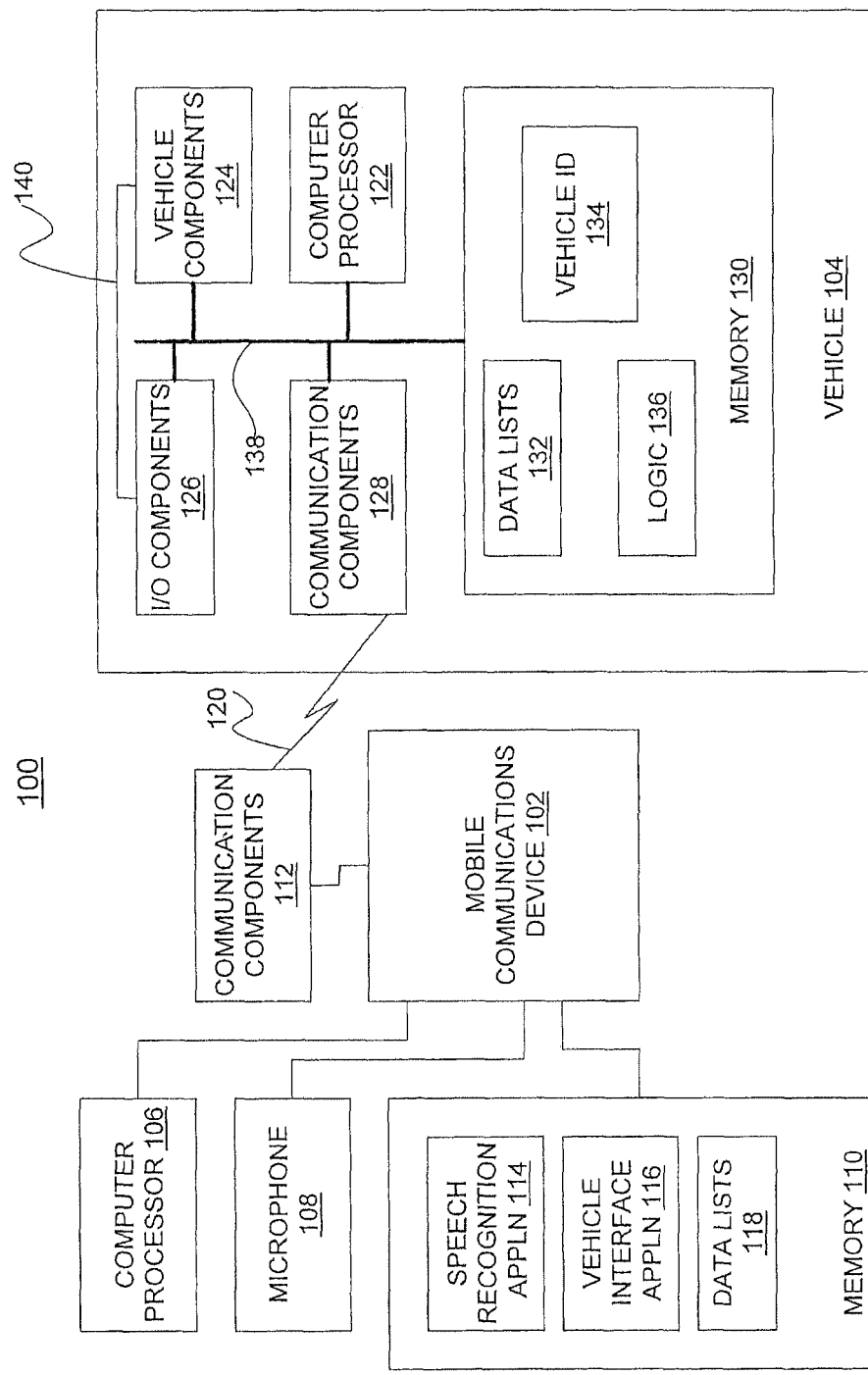
FIG. 1 is a system upon which vehicle-initiated speech recognition functions through an extrinsic device may be implemented in accordance with an exemplary embodiment.

Turning now to FIG. 1, a system 100 upon which the speech recognition functions may be implemented in accordance with an exemplary embodiment will now be described. The system 100 includes a mobile communications device 102 in communication with a vehicle 104 over a data connection 120.

The mobile communications device 102 may be any portable, computer processor-enabled communications device, such as a personal digital assistant (PDA), cellular phone, tablet, or smart phone. The mobile communications device 102 may be configured with enhanced 3G or 4G functionality and includes components typically associated therewith, such as an operating system, one or more computer processors (e.g., computer processor 106), and related circuitry, a microphone 108, and a memory device 110. The mobile communications device 102 also includes communication components 112.

The communication components 112 enable the mobile communications device 102 to communicate over the data connection 120. In one embodiment, the mobile communication device 102 is configured with various communication protocols (e.g., Wi-fi, Bluetooth®, or other low-energy wireless communication protocol) for enabling various wireless communications between the mobile communications device 102 and the vehicle 104. Alternatively, the data connection 120 may be implemented in a wired fashion (e.g., via a universal serial bus (USB) cable), as will be described further herein.

The memory device 110 may store applications and data. As shown in FIG. 1, the memory device 110 stores a speech recognition application 114, a vehicle interface application 116, and data lists 118. The microphone 108 and the speech recognition application 114 are collectively referred to herein as "speech recognition component." The vehicle interface application 116 may be a downloadable mobile application that is configured to receive data lists and other metadata from the vehicle 104 and store the data lists and metadata in the memory device 110. The vehicle interface application 116 also formats the data in the data lists (e.g., if there are two USB sticks in the vehicle 104, the vehicle interface application 116 merges the data lists into a single database).

The data lists 118 and metadata refer to information regarding vehicle components and describe the settings and information content stored in the vehicle 104 with respect to various vehicle components.

As shown in FIG. 1, the vehicle 104 includes a computer processor 122, vehicle components 124, input/output (I/O) components 126, communication components 128, and a memory device 130, communicatively coupled to one another via a data communications bus 138. The computer processor 122 may be a centralized controller of the vehicle 104 that manages communications among vehicle elements (e.g., vehicle components 124, I/O components 126, communication components 128, and the memory device 130) over the bus 138.

The vehicle components 124 may include an infotainment system (e.g., radio, digital music player, etc.); cellular telephone system; heating, ventilation, and air-conditioning (HVAC) system; navigation system; or anything capable of being controlled over the vehicle network. The I/O components 126 include buttons, control knobs, graphical displays, microphones, speakers, and any other type of input/output component that enables an occupant of the vehicle 104 to control features and functions of the vehicle components 124. For example, I/O components 126 associated with a radio of the infotainment system may include a power switch, tuner, volume control, and station scan controls, while I/O components 126 associated with a digital music player of the infotainment system may include a power switch, volume control, and advance/reverse content selection options. It will be understood that in some cases, one or more of the I/O components 126 may be in direct communication with corresponding one of more of the vehicle components 124, e.g., over a direct wire connection 140. The infotainment system may execute applications, such as a digital music application that enables the infotainment system to play music files, which may be stored in a variety of formats, such as .mp3, .wav, .amr, etc.

The communication components 128 enable the vehicle 104 to communicate over the data connection 120. In one embodiment, the communication components 128 are configured with various communication protocols (e.g., Wi-fi, Bluetooth) for enabling various wireless communications between the vehicle 104 and the mobile communications device 102. In an embodiment, the communication components 112 and 128 enable data lists 132 and a vehicle identifier 134 stored in memory device 130 of the vehicle 104 to be transmitted over the data connection 120 to the mobile communications device 102, where they are stored in the memory device 110.

The bus 138 may be any suitable data bus, including a serial data bus that enables various vehicle devices to communicate with one another. The bus 138 may be wired or wireless and may be implemented as a local area network of the vehicle 104 or other network topology.

If the vehicle components 124 controlled by the speech recognition functions include the radio of the infotainment system, the data lists and metadata may, for example, include radio stations and programmed station preferences, volume levels, and power on and off states. In this scenario, the action may include tuning the radio to a radio station indicated in the voice communication, for example. Alternatively, or in addition thereto, the data lists and metadata associated with a digital music player may include music player tags for songs in a song library, volume levels of the system, and forward and reverse modes of operation, and the action may include selecting a song or artist or playlist, adjusting the volume, fast forwarding or reversing an existing song choice, or powering on and off the digital music player.

If the vehicle components 124 controlled by the speech recognition functions include the embedded cellular telephone, the data lists and metadata may, for example, include a contacts list of phone numbers, and the action may include selecting a contact, initiating a call to the contact, and redialing a contact, for example.

If the vehicle components 124 controlled by the speech recognition functions include the HVAC system, the data lists and metadata may, for example, include settings for heating, air-conditioning, zone control valves, and vents in the vehicle 104 and may be identified and controlled for each zone in the vehicle that employs individual zone controls. The action may include turning the HVAC system off and on, as well as regulating temperatures and opening and closing vents, for example.

Figure 2:
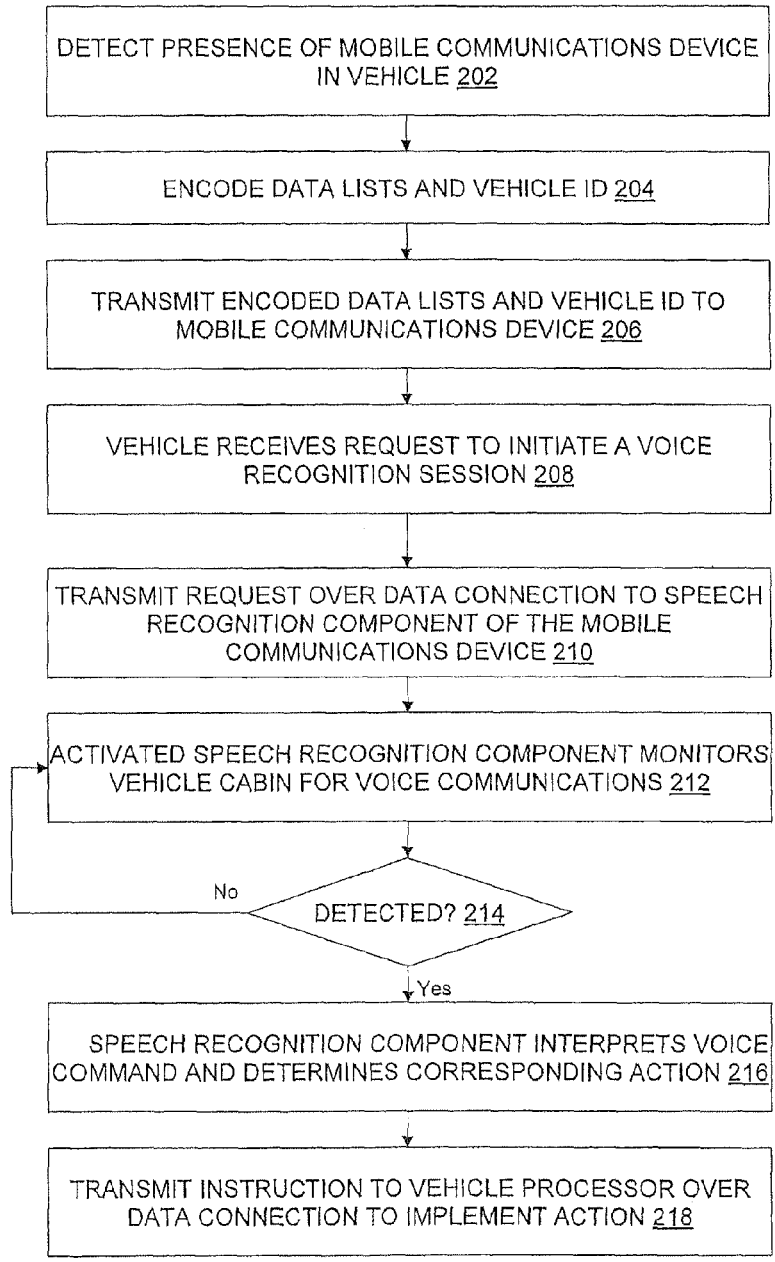
FIG. 2 is a flow diagram describing a process for implementing vehicle-initiated speech recognition functions through an extrinsic device in accordance with an exemplary embodiment.

As indicated above, the exemplary speech recognition functions leverage the functionality of mobile communications devices for use in a vehicle 104 to provide speech recognition capabilities operable for implementing various vehicle functions. The computer processor 122 executes logic 136 to perform at least a portion of these functions in cooperation with the vehicle interface application 116. Turning now to FIG. 2, a flow diagram describing a process for implementing the speech recognition functions in accordance with an exemplary embodiment will now be described.

At step 202, the logic 136 detects a presence of the mobile communications device 102 in the vehicle 104 via the communication components 128 of the vehicle 104 and the communication components 112 of the mobile communications device 102. The logic 136 encodes data lists 132 of content (e.g., metadata associated with the infotainment system, HVAC, and navigation system) stored in the memory device 130 of the vehicle 104, and also encodes the vehicle identifier 134 for the vehicle at step 204. The vehicle identifier 134 may be any unique identifier of the vehicle, such as a vehicle identification number (VIN).

At step 206, the encoded data lists and metadata, along with the encoded vehicle identifier 134 are transmitted by the logic 136 over the data connection 120 via the communication components 128 and 112 to the mobile communications device 102. The data lists 132 are linked to the vehicle identifier 134 in order to correlate the data lists 132 with the vehicle 104 from which they are transmitted.

At step 208, an occupant of the vehicle 104 implements a request to initiate a voice recognition session. This request may be implemented using various techniques. For example, the request may be implemented by selecting one of the I/O components 126 in the vehicle 104 that is configured for initiating the session. Accordingly, the selection of the I/O component 126 is received by the logic 136 over the bus 138.

The logic 136 transmits the request and the vehicle identifier 134 over the data connection 120 to the speech recognition application 114 of the mobile communications device 102 at step 210. The speech recognition component (i.e., the speech recognition application 114 and the microphone 108) is activated in response to the request.

The speech recognition component monitors the vehicle cabin for voice communications at step 212. If no voice communications are detected at step 214, the process returns to step 212 where the monitoring continues. However, if a voice communication is detected at step 214, the speech recognition application 114 interprets the voice communication and determines a corresponding action at step 216. The action may include any action configured for the vehicle components 124. The action may be determined by retrieving the data lists 118 from the memory device 110 of the mobile communications device 102 via the vehicle identifier 134 that is linked to the data lists 118 and evaluating the voice communication in view of the data lists 118. At step 218, an instruction configured to execute the action is transmitted via the vehicle interface application 116, computer processor 106, and communication components 112 over the data connection 120 to the vehicle 104 for implementation. In an embodiment, the speech recognition application 114 may confirm the action with the user before executing the action.

Technical effects of the speech recognition functions include leveraging the functionality of mobile communications devices for use in a vehicle to provide speech recognition capabilities operable for implementing various vehicle functions. A mobile communications device embedded with speech recognition components is provided with an application configured to receive metadata associated with the vehicle, activate its speech recognition components, and interpret voice commands from occupants of the vehicle. Once interpreted by the mobile communications device, the application transmits instructions to the vehicle directing corresponding vehicle components to implement an action associated with the voice commands. Likewise, the vehicle includes logic that is configured to communicate the metadata and speech recognition component activation requests.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system, comprising:
   a computer processor embedded in a vehicle; and
   logic executable by the computer processor, the logic configured to implement a method, the method comprising:
   detecting a presence of a mobile communications device in the vehicle via a communication component of the vehicle, the mobile communications device configured with a speech recognition component;
   encoding data lists of content stored in a memory device of the vehicle;
   transmitting the data lists of content and a unique identifier of the vehicle over a data connection to the mobile communications device, the data lists of content linked to the unique identifier;
   in response to receiving a request to initiate a voice recognition session via an input component of the vehicle, transmitting the request and the unique identifier over the data connection to the speech recognition component of the mobile communications device;
activating the speech recognition component responsive to the request;
retrieving the data lists of content from the mobile communications device via the unique identifier; and
in response to a user voice command received by the speech recognition component, the speech recognition component interprets the user voice command, determines an action by evaluating the user voice command in view of the data lists of content, and transmits an instruction to the computer processor, the instruction directing the vehicle to implement the action.

2. The system of claim 1, wherein the data connection comprises at least one of:
a low-energy wireless communication channel; and
a universal serial bus cable.

3. The system of claim 1, wherein the data lists of content include metadata associated with an infotainment system in the vehicle, the metadata including radio station data.

4. The system of claim 3, wherein the action includes tuning a radio of the vehicle to a station indicated in the user voice command.

5. The system of claim 1, wherein the data lists of content include metadata associated with an infotainment system in the vehicle, the metadata including music player tags.

6. The system of claim 5, wherein the action includes playing a song through the infotainment system of the vehicle, the song indicated in the user voice command.

7. The system of claim 1, wherein the data lists of content include metadata associated with a vehicle phone, the metadata including contact lists of phone numbers.

8. The system of claim 7, wherein the action includes initiating a telephone call through the vehicle phone and a telephone number subject to the telephone call is indicated in the user voice command.

9. The system of claim 1, wherein the data lists of content include metadata associated with a heating, ventilation, and air-conditioning (HVAC) system of the vehicle, the metadata including an HVAC setting associated with an HVAC-controlled zone in the vehicle.

10. The system of claim 9, wherein the action includes activating the HVAC setting indicated in the user voice command.

11. A method, comprising:
detecting, via a communication component of a vehicle, a presence of a mobile communications device in the vehicle, the mobile communications device configured with a speech recognition component;
encoding, via a computer processor embedded in the vehicle, data lists of content stored in a memory device of the vehicle;
transmitting, via the computer processor, the data lists of content and a unique identifier of the vehicle over a data connection to the mobile communications device, the data lists of content linked to the unique identifier;
in response to receiving a request to initiate a voice recognition session via an input component of the vehicle, transmitting the request and the unique identifier over the data connection to the speech recognition component of the mobile communications device;
activating the speech recognition component responsive to the request;
retrieving, via a computer processor of the mobile communications device, the data lists of content via the unique identifier; and
in response to a user voice command received by the speech recognition component, the speech recognition component interprets the user voice command, determines an action by evaluating the user voice command in view of the data lists of content, and transmits an instruction to the computer processor of the vehicle, the instruction directing the vehicle to implement the action.

12. The method of claim 11, wherein the data lists of content include metadata associated with an infotainment system in the vehicle, the metadata including radio station data, and the action includes tuning a radio of the vehicle to a station indicated in the user voice command.

13. The method of claim 11, wherein the data lists of content include metadata associated with an infotainment system in the vehicle, the metadata including music player tags.

14. The method of claim 13, wherein the action includes playing a song through the infotainment system of the vehicle, the song indicated in the user voice command.

15. The method of claim 11, wherein the data lists of content include metadata associated with a vehicle phone, the metadata including contact lists of phone numbers, and the action includes initiating a telephone call through the vehicle phone, and a telephone number subject to the telephone call is indicated in the user voice command.

16. The method of claim 11, wherein the data lists of content include metadata associated with a heating, ventilation, and air-conditioning (HVAC) system of the vehicle, the metadata including HVAC settings associated with each HVAC-controlled zone in the vehicle, and the action includes activating one of the HVAC settings indicated in the user voice command.

17. A computer program product comprising a computer-readable storage medium having instructions embodied thereon, which when executed by a computer, cause the computer to implement a method, the method comprising:
detecting, via a communication component of a vehicle, a presence of a mobile communications device in the vehicle, the mobile communications device configured with a speech recognition component;
encoding, via a computer processor embedded in the vehicle, data lists of content stored in a memory device of the vehicle;
transmitting, via the computer processor, the data lists of content and a unique identifier of the vehicle over a data connection to the mobile communications device, the data lists of content linked to the unique identifier;
in response to receiving a request to initiate a voice recognition session via an input component of the vehicle, transmitting the request and the unique identifier over the data connection to the speech recognition component of the mobile communications device;
activating the speech recognition component responsive to the request, the activating causing a computer processor of the mobile communications device to retrieve the data lists of content via the unique identifier; and
in response to a user voice command received by the speech recognition component, the speech recognition component interprets the user voice command, determines an action by evaluating the user voice command in view of the data lists of content, and transmits an instruction to the computer processor of the vehicle, the instruction directing the vehicle to implement the action.

18. The computer program product of claim 17, wherein the data lists of content include metadata associated with an infotainment system in the vehicle, the metadata including radio station data, and the action includes tuning a radio of the vehicle to a station indicated in the user voice command.

19. The computer program product of claim 17, wherein the data lists of content include metadata associated with a vehicle phone, the metadata including contact lists of phone numbers, and the action includes initiating a telephone call through the vehicle phone, and a telephone number subject to the telephone call is indicated in the user voice command.

20. The computer program product of claim 17, wherein the data lists of content include metadata associated with a heating, ventilation, and air-conditioning (HVAC) system of the vehicle, the metadata including an HVAC setting associated with an HVAC-controlled zone in the vehicle, and the action includes activating the HVAC setting indicated in the user voice command.

* * * * *